(12) United States Patent
Hangud et al.

(10) Patent No.: US 8,131,681 B1
(45) Date of Patent: Mar. 6, 2012

(54) BACKUP DISK-TAPE INTEGRATION METHOD AND SYSTEM

(75) Inventors: Vinay Hangud, Sunnyvale, CA (US); Yunlong Li, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 99 days.

(21) Appl. No.: 12/691,735

(22) Filed: Jan. 21, 2010

(51) Int. Cl.
*G06F 17/30* (2006.01)
(52) U.S. Cl. ...................................... 707/654
(58) Field of Classification Search .................. 707/654
See application file for complete search history.

(56) References Cited

U.S. PATENT DOCUMENTS

| | | | |
|---|---|---|---|
| 7,711,913 B1* | 5/2010 | Moody et al. ................. | 711/162 |
| 2006/0107159 A1* | 5/2006 | Krasilinec et al. ............ | 714/742 |
| 2007/0088755 A1* | 4/2007 | Nesbitt et al. ................ | 707/200 |
| 2007/0283017 A1* | 12/2007 | Anand et al. ................. | 709/226 |
| 2008/0104345 A1* | 5/2008 | Maruyama et al. ........... | 711/162 |
| 2008/0295102 A1* | 11/2008 | Akaike et al. ................ | 718/102 |
| 2009/0043829 A1* | 2/2009 | Mizuno ........................ | 707/204 |

OTHER PUBLICATIONS

Turlapaty, TechTip: Automatic Backup Exec Disk-to-Disk-to-Tape Operations, May 26, 2009, Symantec Corporation.*

* cited by examiner

*Primary Examiner* — James Trujillo
*Assistant Examiner* — William Spieler
(74) *Attorney, Agent, or Firm* — Wiesner & Associates; Leland Wiesner

(57) ABSTRACT

Aspects of the present invention provide a disk-to-disk-to-tape backup method and system responsive to a combined backup request to backup a dataset to a backup disk according to a disk backup schedule and then to backup the dataset from the backup disk to a backup tape according to a tape backup schedule. The combined backup method completes a backup of the dataset to the backup disk and then to a backup tape device in accordance with a resolved schedule that considers potential conflicts between the schedules. To restore, aspects of the invention receive a request to restore a backup of the dataset from a backup-tape and the resolved schedule derived from the tape backup schedule and the disk backup schedule. The restoration verifies that a backup tape holds the target dataset by matching a combined backup identifier from the request against a corresponding combined backup identifier held in storage.

20 Claims, 4 Drawing Sheets

BACKUP DISK-TAPE INTEGRATION METHOD AND SYSTEM

INTRODUCTION

Conventional backup solutions employ two distinct systems for protecting data: a disk-to-disk backup system and a tape backup system. A company may first use the disk-to-disk backup system to create an immediate copy of information from a primary disk to a secondary or backup disk. The disk-to-disk backup systems copies a complete disk image or smaller portions of the data to the secondary disk. Copying individual files or blocks of data, rather than a disk image, may save backup storage space and decrease the overall time to complete a backup. Storage devices and software from NetApp, Inc. of Sunnyvale Calif. perform disk imaging using the SnapMirror® product and perform block level backups to a secondary disk using SnapVault® backup technologies. Both of these backup options are readily managed and made available as stand-alone products as well as through a NetApp, Inc. storage management product called DataFabric® Manager (DFM).

A distinct and separate tape backup system is required if a company or user then wants to archive the data from the backup disk onto tape. These tape backup systems generally include a tape backup server and one or more backup tape drives. Each backup tape drive has removable tape storage that holds the data and may be manually operated or part of a larger robotic backup system. The robotic tape backup system obviates the need for an administrator to manually load the tape onto the tape drive and instead uses robotic arms to perform the tape loadingiunloading from racks of tapes.

Distinct differences in disk-to-disk backup and tape backup have been partially responsible for the lack of any integrated solutions. The disk-to-disk systems do not require tapes or cartridges and generally operate at significantly higher speeds and greater capacities. Second, tape backup systems are generally considered archive solutions and therefore used less frequently than the disk-to-disk systems. Moreover, companies making tape backup products have no method of reliably integrating their proprietary tape backup systems with the multitude of disk-to-disk backup solutions.

Presently, customers purchase and operate separate tape backup systems and disk-to-disk backup systems. For example, customers may purchase disk-to-disk backup solutions from NetAppt, Inc. and combine with separate tape backup systems such as NetBackup® (NBU) made by Symantec or other similar products by the likes of EMC, IBM, Hewlett Packard or others. However, the lack of integration between the disparate technologies of tape backup and disk-to-disk storage effectively requires them to be separately managed and operated. Of course, mismanaging even a portion of the backup process may result in lost data and business losses.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein.

SUMMARY

Figure 1:
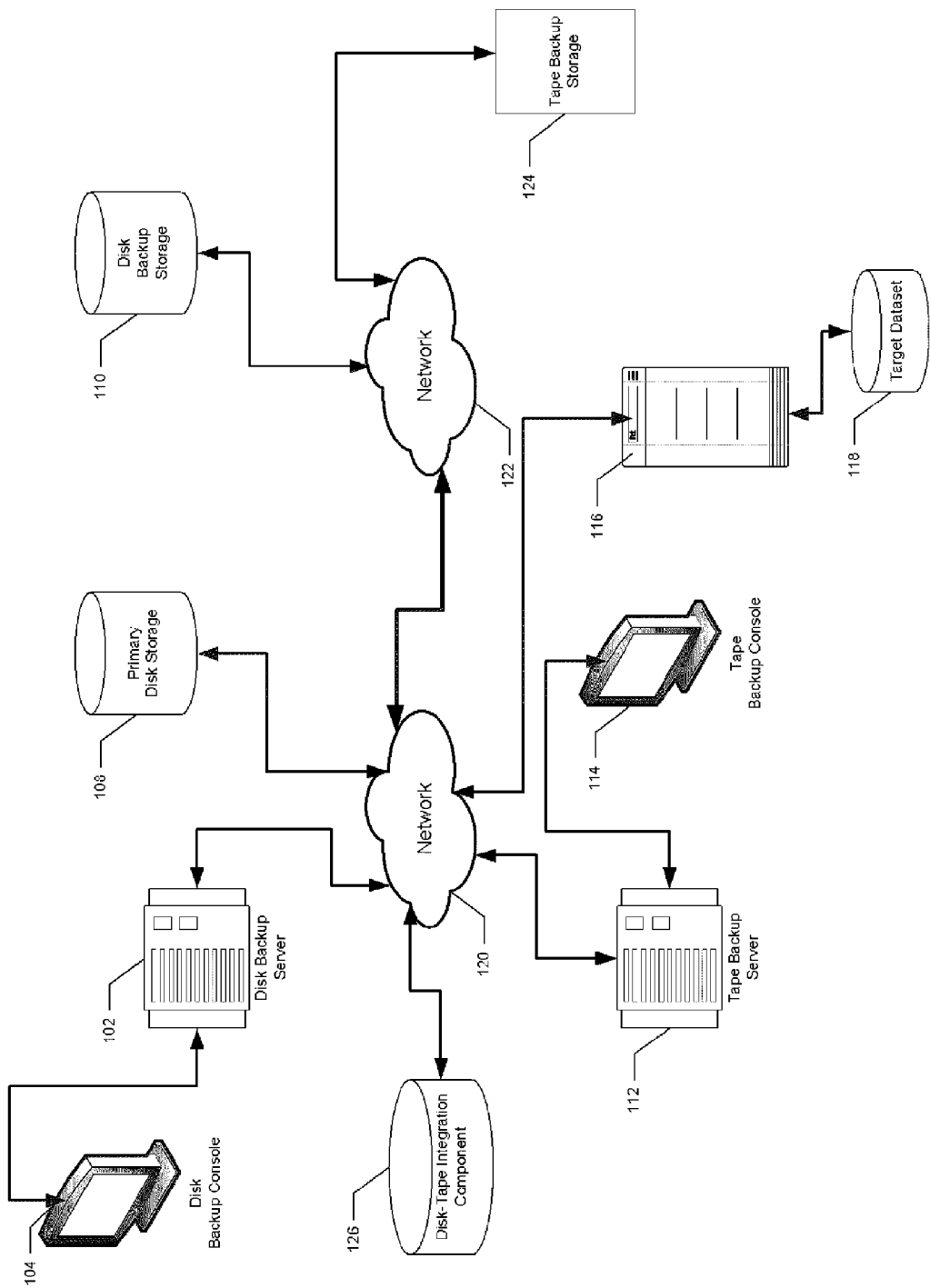
FIG. 1 is a schematic block diagram of an exemplary system illustrating a disk backup server and tape backup server working together in accordance with aspects of the present invention.

Aspects of the present invention provide a method of performing a disk-to-tape backup in coordination with a prior disk-to-disk backup. Sometimes this is also referred to as a disk-to-disk-to-tape backup. The backup method includes receiving a combined backup request to backup a dataset to a backup disk according to a disk backup schedule and then to backup the dataset from the backup disk to a backup tape according to a tape backup schedule. Potential conflicts from the tape backup schedule and disk backup schedule are considered when generating a resolved schedule. Accordingly, the combined backup method first completes a backup of the dataset to the backup disk in accordance with the resolved schedule. The resolved schedule further directs backing up the dataset from the backup disk to the backup tape device.

To restore the dataset, aspects of the present invention receive a request to restore a backup of the dataset from a backup-tape. The restoration occurs according to a resolved schedule derived from the tape backup schedule and the disk backup schedule; potential conflicts between these two individual schedules are considered. The restoration verifies that a particular backup tape holds the target dataset by matching a combined backup identifier from the request against an associated combined backup identifier held in storage associated with the backup tape. In one implementation, the combined backup identifier references both the backup disk and the backup tape initially involved in backing up the dataset. A separate database may be used to store one or more combined backup identifiers or they may be inserted into a header section of the backup tape. Once verified, aspects of the present invention extract a raw target dataset from the backup tape that may also include metadata outlining the format of the raw target data previously stored on a disk backup device. Using this metadata, one implementation assembles the target dataset from the raw target dataset. The resultant target dataset is delivered from the raw tape to a predetermined disk storage location responsive to the restoration request.

DETAILED DESCRIPTION

Aspects of the present invention provide method of integrating a discrete disk-to-disk backup system with a discrete disk-to-tape backup system. The methodologies associated with this method and system permit both discrete systems to be controlled and administered from a single console or point of control. Additional benefits provided by aspects of the present invention include, but are not limited to, one or more of the following mentioned herein below.

Aspects of the present invention consider that disk-to-disk backups may likely complete more quickly than disk-to-tape backups. A resolved schedule is created to accommodate the timing differences involved in backing up to or restoring from tape as compared with disk. Potential and actual conflicts between a tape backup schedule and disk backup schedule are considered and resolved.

Further aspects of the present invention can work with many different tape backup systems and disk backup systems. In one implementation, the combined backup request is initiated from the disk-to-disk backup system yet also controls the disk-to-tape backup system. It is contemplated that aspects of the present invention could alternatively be initiated from the disk-to-tape backup system while also controlling the disk-to-disk backup system. In either case, aspects of the present invention are platform agnostic and therefore may be implemented with various combinations of disk-backup systems and tape-backup systems.

Referring to FIG. 1, the schematic block diagram illustrates an exemplary disk-to-disk-to tape backup system in accordance with aspects of the present invention. Disk backup server 102 in FIG. 1 may communicate over network 120 and network 122 while performing a disk-to-disk backup between primary disk storage 108 and disk backup storage 110 (also known as secondary disk storage). For example, disk backup server 102 may store a target dataset 118 from a user's server 116 on primary disk storage 108 and then backup the target dataset 118 from primary disk storage 108 to disk backup storage 110. Administrators may control and monitor the disk-to-disk backup through a disk backup console 104. In one implementation, disk-to-disk backup may be administered through disk backup server 102 and utilize a combination of SnapMirror®, SnapVault® and Data Fabric®Manager (DFM) from NetApp, Inc. of Sunnyvale, Calif.

In one embodiment, a disk backup storage 110 can be file-level servers such as used in a network-attached storage (NAS) environment, block-level storage servers such as used in a storage area network (SAN) environment, or other storage systems which are capable of providing both file-level and block-level service. Further, although disk backup storage 110 is illustrated as a single unit in FIG. 1, it can also be implemented in a distributed architecture. For example, each storage device from disk backup storage 110 can be implemented with multiple distributed storage servers. It can also include a physically separate network module (e.g., "N-module") and disk module (e.g., "D-module") (not shown), which communicate with other storage servers over an external interconnect.

The N-module acts as a front-end of the storage server, exporting services to clients; and the D-module acts as the back-end, managing and implementing a parity declustered distribution of a RAID organization on the underlying storage of the storage server. The N-module and D-module can be contained in separate housings and communicate with each other via network connections. Thus, the N-module and the D-module enable a storage server to be physically separated into multiple modules that can be distributed across a network. In one embodiment, storage system 104 can include multiple N-modules and D-modules, each of the N-modules corresponding to one or more D-modules, and each of the D-modules corresponding to one or more N-modules.

Tape backup server 112 also communicates over network 120 and network 122 while performing a disk-to-tape backup of data on tape backup storage 124. For example, network 120 may be a local-area-network (LAN) and network 122 may be a wide-area-network (WAN) having a shared high-speed back-bone connection therebetween. The tape backup storage 124 may include a single backup tape drive operated manually or a very large robotic storage system with robotic arms and racks of tapes. The tape backup console 114 allows the administrator to also monitor and control the tape backup processing. To spread capital and operating costs, disk backup storage 110 and tape backup storage 124 may be large shared facilities servicing multiple disk backup servers and tape backup servers other than those illustrated in FIG. 1.

In accordance with aspects of the present invention, disk-tape integration component 126 may be loaded into memory on disk backup server 102 where it can monitor and control not only the disk-to-disk type backups but also the disk-to-tape type backups. The disk-tape integration component 126 designed in accordance with aspects of the present invention transmits a combined backup request that initiates the disk-to-disk backup and then a disk-to-tape backup.

Figure 2:
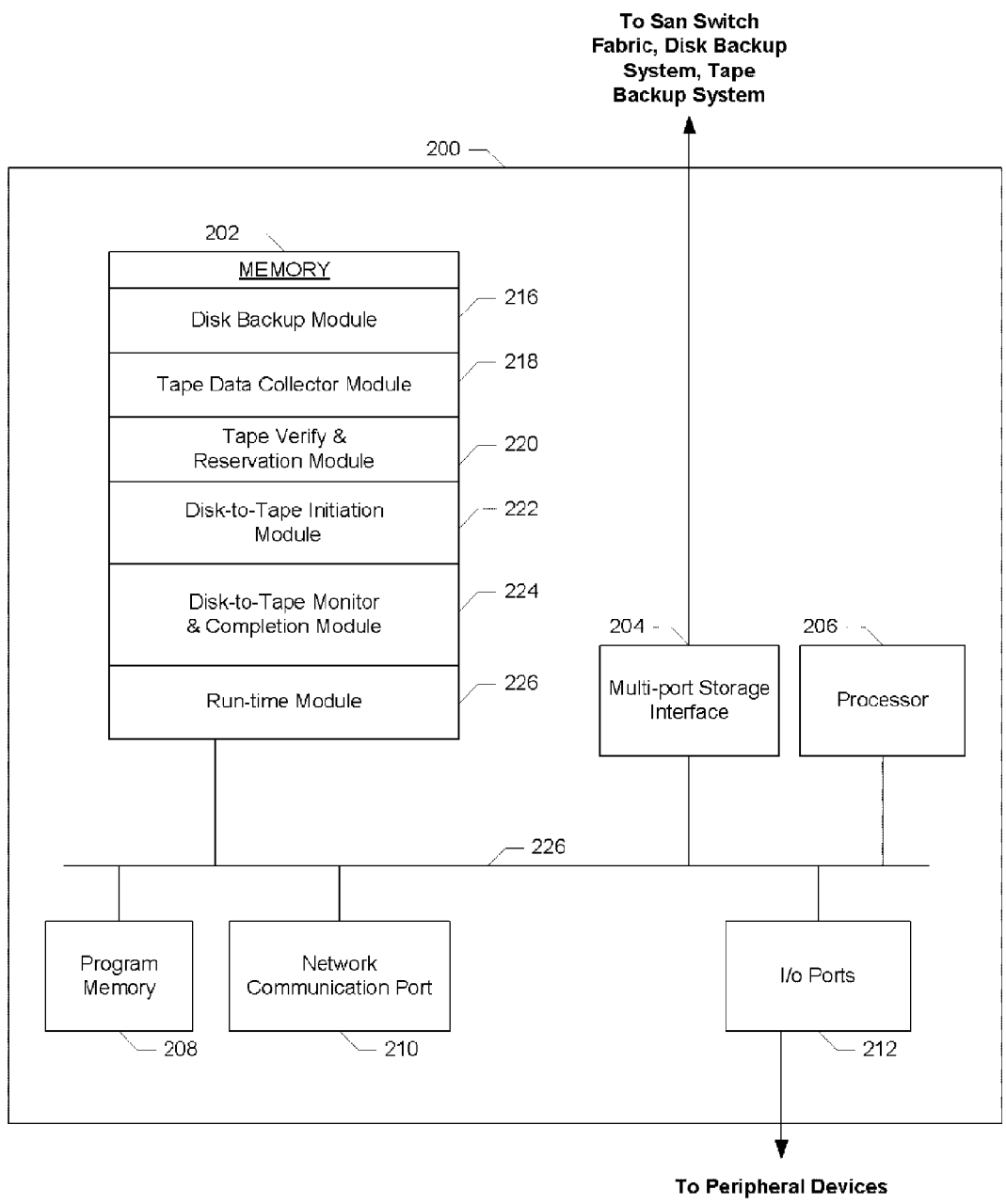
FIG. 2 is a schematic block diagram representation of software components and hardware designed in accordance with one implementation of the present invention.

FIG. 2 is a block diagram representation of a computer system configured as a backup server and capable of performing a combined backup in accordance with aspects of the present invention. In this example, computer device 200 includes a memory 202, a multi-port storage interface 204, a processor 206, program memory 208, network communication port 210, secondary storage 212, and I/O Ports 214 all communicating over interconnect 226 and executing on run-time module 226.

Multi-port storage interface 204 generally connects directly to a SAN switch however it may also provide access to a disk backup system or tape backup system. Alternatively, it is contemplated that computer device 200 may access both the disk backup system and tape backup system on the associated network through network communication port 210 and appropriate protocols such as iSCSI, ATA Over Ethernet (AoE), or Fibre Channel over Ethernet.

In operation, memory 202 may include one or more modules to implement various aspects of the present invention. Disk backup module 216 includes functions that initiate and monitor disk-to-disk backup from primary disk storage to a disk backup storage also known as secondary disk storage. Tape data collector module 218 extracts information from a combined backup request naming a tape backup server, a tape backup device, and potentially a backup tape. It is also contemplated that tape data collector module 218 further obtains a tape backup schedule and other tape related parameters from a tape backup server or overall storage manager such as the Data Fabric® Manager (DFM) from NetApp, Inc. of Sunnyvale, Calif. Tape verify and reservation module 220 operates to confirm that a specific tape backup server and related tape backup devices are online, functioning and available. If a requested tape device is not available then tape verify and reservation module 220 may return a parameter indicating that the requested tape backup device is not available.

Once a tape device is deemed available, disk-to-tape initiation module 222 may initiate the disk-to-tape backup process and present notification that the disk-to-tape backup has begun. Disk-to-tape monitor and completion module 224 checks if the ongoing backup to tape is working and finally determines if the backup-to-tape from disk has completed in an acceptable manner given a particular completion code. One or more of the aforementioned modules execute within run-time module 226, which manages the allocation and de-allocation of computing resources.

Figure 3:
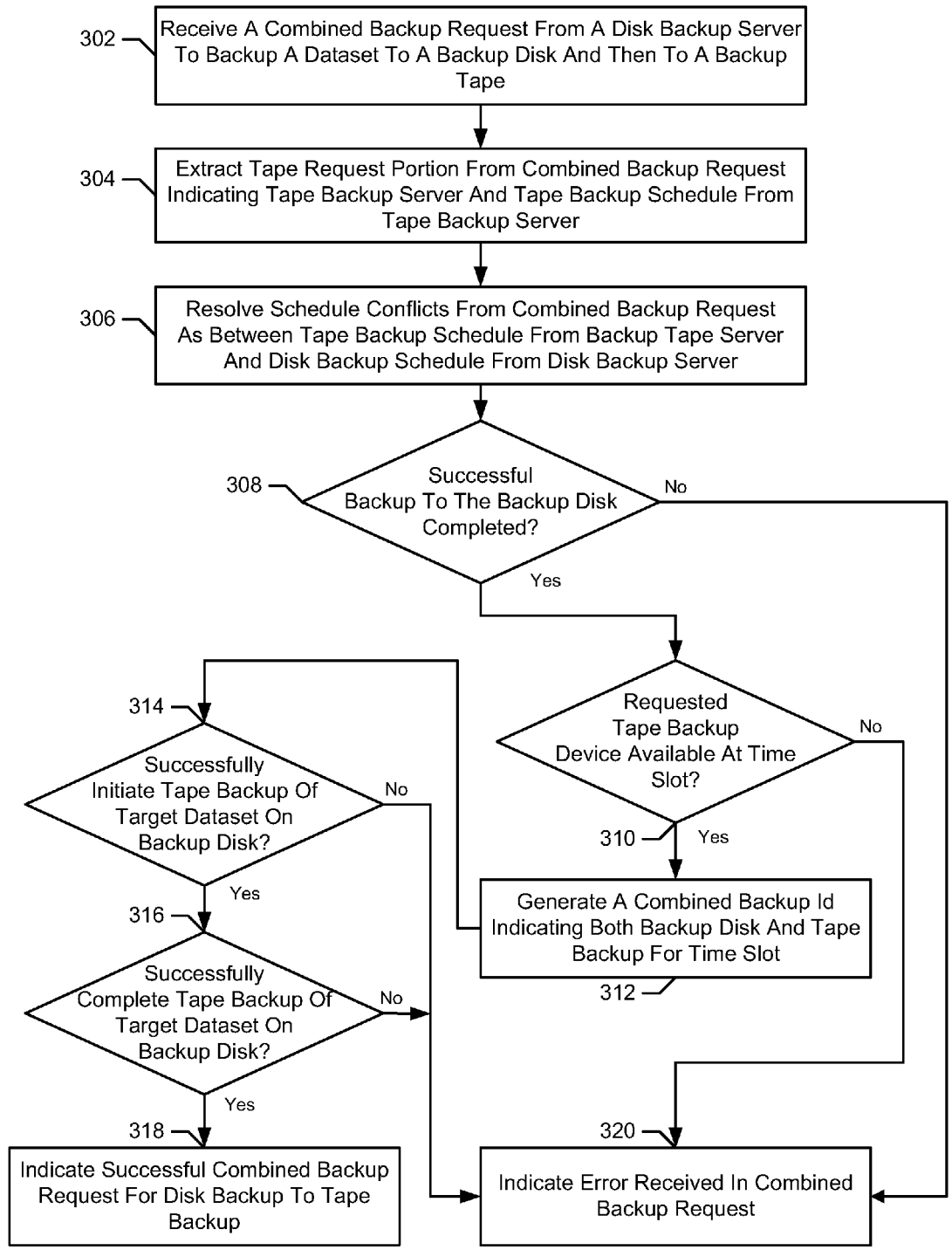
FIG. 3 is a flowchart diagram of the operations used for performing a disk-to-disk backup and then a disk-to-tape backup in accordance with one implementation of the present invention.

FIG. 3 is a flowchart diagram of the operations used for performing a disk-to-disk backup and then a disk-to-tape backup in accordance with one implementation of the present invention. In one implementation, a disk backup server receives a combined backup request to backup a dataset to a backup disk and then to a backup tape (302). The combined backup request may also include a disk backup schedule describing when the disk backups should occurs as well as a tape backup schedule indicating when the tape backup requests also should occur. These schedules may be specified together or independent of each other, as may be the case, in accordance with aspects of the present invention.

Next, aspects of the present invention extract a tape request portion from the combined backup request indicating tape backup server, tape backup schedule from tape backup server and other tape related parameters (304). In one implementation, the disk backup server and disk backup schedule are provided directly by the disk backup server and inherently part of the combined backup request; they need no further processing in the default case. Alternatively, it is also possible that aspects of the present invention must also extract a disk request portion from the combined backup request that describes a disk backup server, a disk backup schedule and/or available disk backup devices.

Once both the disk backup schedule and tape backup schedule are identified, aspects of the present invention attempts to resolve schedule conflicts from the combined backup request (306). In one implementation, this may include estimating a disk backup interval and a tape backup interval according to the combined backup request and consistent with the disk backup schedule for the backup disk and the tape backup schedule for the backup tape. The disk backup interval is the estimated time from start to finish when performing the particular disk backup for a given target dataset. Likewise, the tape backup interval is an estimate of the time it will take to backup the same dataset when going from tape to disk. Together these time intervals define a minimum time frame it might take to complete the combined backup request barring any other sources of delay.

Conflicts may occur if there is not sufficient time to complete both backups, if they have overlapping time slots or any other incompatibility. In one implementation, conflicts are resolved by comparing the disk backup interval with the tape backup interval and then to identify if a safety margin exists between the disk backup interval and tape backup interval. Often, the conflicts may be resolved by adjusting the disk backup interval and the tape backup interval to increase the safety margin large enough to ensure that the disk backup to be performed during the disk backup interval may be completed prior to the tape backup to be performed during the tape backup interval.

Next, aspects of the present invention initiate and attempt to successfully complete a backup of the dataset to the backup disk in accordance with the resolved schedule (308). As previously described, the resolved schedule is derived from resolving potential conflicts from the tape backup schedule and the disk backup schedule. In addition it may also be necessary to verify availability of the backup disk associated with the disk backup server as it may already be busy with another request or off-line and not available. An error is indicated when the backup of the dataset to the backup disk cannot be completed in accordance with the combined backup request (320).

Next, aspects of the present invention verify availability of the tape backup device associated with the tape backup server when the dataset is successfully backed up to the backup disk (310). For example, one implementation may determine if a requested tape backup device is available at a particular time slot. If the tape backup device is not available or offline then an error is indicated in response to the combined backup request (320).

Otherwise, aspects of the present invention may generate a combined backup identifier or backup id indicating both a backup disk and a backup tape to complete the backup at the particular time slot (312). The combined backup identifier is a value used to track the dataset as it is backed up from disk onto a particular backup tape by the tape device. For example, the combined backup identifier referencing both the backup disk and the backup tape can also be used to restore the dataset back to the original backup disk or primary disk location. Accordingly, the combined backup identifier is then stored in a storage area available for subsequent access when performing a restoration of the dataset from the backup tape used with the combined backup request. The storage area may be in a separate stand-alone database, searchable data file and/or may be located in a header area of the backup tape.

Aspects of the present invention then attempts to initiate the tape backup of the target dataset from the backup disk to the backup tape (314). If the tape backup of the target dataset cannot be initiated then an error is indicated in response to the combined backup request (320). For example, the tape device may have gone off-line or otherwise become unavailable shortly after initiating the backup-to-tape. However, if the tape backup can be initiated successfully then a determination is made if the tape backup of the dataset from disk has successfully completed (316). Aspects of the present invention may check at predetermined intervals if the tape backup has been completed or suffered some failure and indicate an error (320).

Preferably, aspects of the present invention complete a backup of the dataset from the backup disk to the backup tape associated with a tape backup device and server and in accordance with the resolved schedule (316). Accordingly, one implementation of the present invention would then indicate the combined backup request of the dataset to the backup disk and then to the backup tape has been successfully completed (318).

Figure 4:
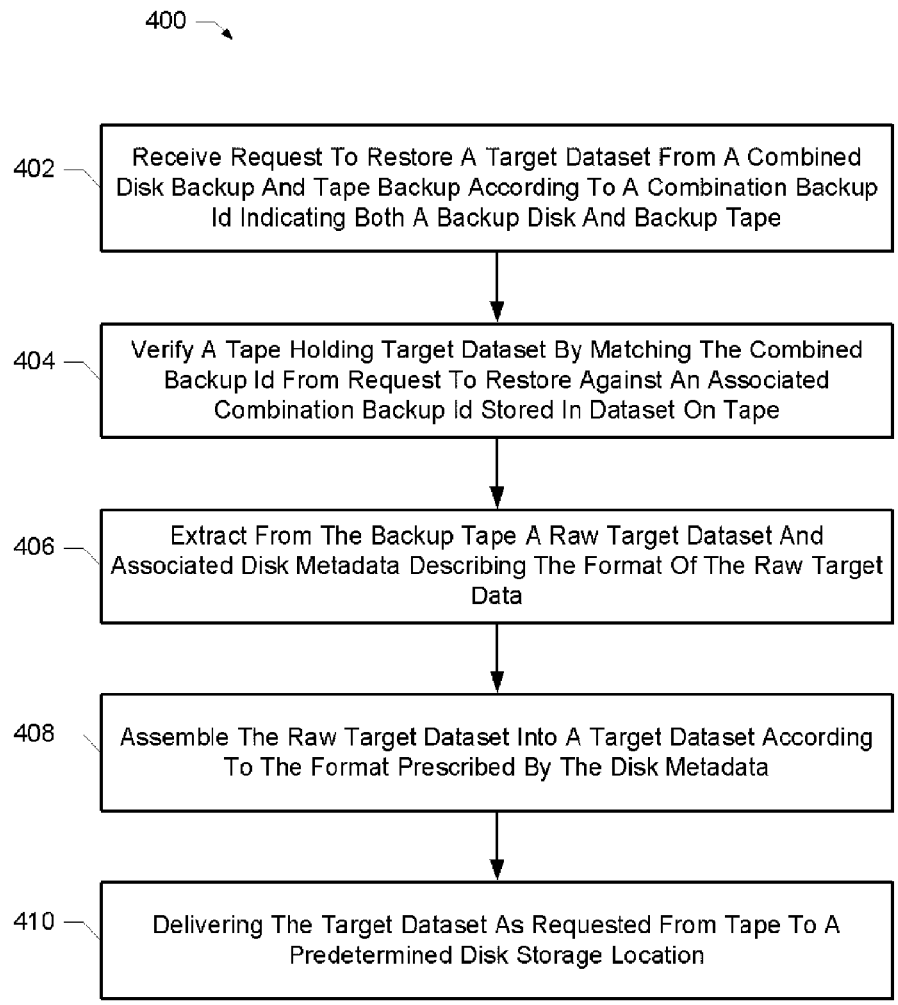
FIG. 4 is another flowchart diagram of the operations used to restore a disk-to-tape backup onto a predetermined location on disk in accordance with one implementation of the present invention.

FIG. 4 is another flowchart diagram of the operations used to restore a disk-to-tape backup 400 onto a predetermined location on disk in accordance with one implementation of the present invention. Aspects of the present invention initially receive a request to restore a target dataset from a combined disk backup and tape backup according to a combination backup identifier (402). As previously described, the combined backup identifier indicates both a backup disk and backup tape in one implementation. For example, this is useful if the request is to restore the dataset from the backup tape back to the backup disk or even to the original location on primary disk.

Next, aspects of the present invention verify the tape backup is actually holding the target dataset (404). In one implementation, the verification matches the combined backup identifier from the restoration request against an associated combined backup identifier stored on tape. Alternatively, the backup identifier from the request may be compared against an entry in a separate stand-alone database and not an entry stored on tape.

The backup tape is then used to extract a raw target dataset and associated disk metadata describing the format of the raw target data (406). In one implementation, the tape data is an unstructured stream of data organized in a payload section followed then by a metadata area describing how to reconstruct the payload into the target data as originally stored on disk.

Accordingly, aspects of the present invention assemble the raw target dataset into a target dataset according to the format prescribed by the disk metadata (408). For example, the disk metadata may indicate that the data should be formatted into a series of files within the WAFL® (Write Anywhere File Layout) filesystem format created and used in the storage technology systems by NetApp, Inc. of Sunnyvale, Calif. If it is requested, the target dataset is then delivered from the backup tape to the predetermined disk storage location (410). In one implementation, the predetermined disk storage location may be specified as either the backup disk or the original location of the dataset on primary disk.

It is contemplated that aspects of the present invention attempt to resolve schedule conflicts from both the disk backup schedule and tape backup schedule when performing a restoration. The restoration may use the same devices and equipment used for performing the combined backups as previously described. Accordingly, this may include estimating a disk backup interval and a tape backup interval for performing the projected restoration consistent with the disk backup schedule for the designated disk and the tape backup schedule for the designated tape. In this case, these time intervals define a minimum time frame it might take to complete the restoration request barring any other sources of delay. Also as previously described, it may be necessary to adjust scheduled use of the tape and disk to avoid conflicts with backups, restorations or combinations thereof. For example, conflicts may be resolved by adjusting the disk backup interval and the tape backup interval to increase the safety margin large enough to ensure that the tape restoration to be performed during the tape backup interval may be completed prior to the disk restoration performed during the disk backup interval. Likewise, aspects of the present invention verify availability of the tape backup device associated with the tape backup server when the dataset is successfully backed up to the backup disk. For example, one implementation may determine if a requested tape backup device is available at a particular time slot. If the tape backup device is not available or offline then an error is indicated in response to the combined backup request. Aspects of the invention may also verify availability of the backup disk associated with the backup disk server at the particular time slot for the restoration to disk.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Multiprocessor or MP may include multiple individual processors coupled together communicating over an off-chip high speed bus as well as more tightly coupled arrangements. For example, a multicore processor may also be considered MP as it is able to handle multiple independent instruction streams and communicates using at least some on-die connections between cores located on the same die. Accordingly, it should be appreciated aspects of the present invention applies not only to a single processor or multiple processors but also to single core and multicore computer processor implementations.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents. For example, aspects of the present of the invention are described as incorporated into a disk backup module however it is also possible that alternate implementation would instead be incorporated into a tape backup module. For example, it is contemplated that aspects of the present invention may be incorporated in a NetApp, Inc. storage management product called DataFabric® Manager (DFM) however it is contemplated that alternate implementations may be incorporated in may other data management products that relate to data protection, data security or any other data process that might benefit from the integration of disk backup and tape backup. As a result, aforementioned descriptions should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of fulfilling a request to perform a disk-to-disk-to-tape backup, comprising:
   receiving a combined backup request to backup a dataset to a backup disk according to a disk backup schedule and then to backup the dataset from the backup disk to a backup tape according to a tape backup schedule;
   completing a backup of the dataset to the backup disk in accordance with a resolved schedule derived from resolving potential conflicts from the tape backup schedule and the disk backup schedule;
   completing a backup of the dataset from the backup disk to the backup tape associated with a tape backup server and in accordance with the resolved schedule; and
   indicating the combined backup request of the dataset to the backup disk and then to the backup tape has been successfully completed.

2. The method of claim 1 wherein deriving the resolved schedule further comprises:
- estimating a disk backup interval and a tape backup interval according to the combined backup request and consistent with the disk backup schedule for the backup disk and the tape backup schedule for the backup tape;
- comparing the disk backup interval with the tape backup interval to identify if a safety margin exists between the disk backup interval and tape backup interval; and
- adjusting the disk backup interval and the tape backup interval to increase the safety margin large enough to ensure that the disk backup to be performed during the disk backup interval is completed prior to the tape backup to be performed during the tape backup interval.

3. The method of claim 1 wherein completing a backup of the dataset from the backup disk to the backup tape further comprises:
- verifying availability of a tape backup device associated with the tape backup server when the dataset is successfully backed up to the backup disk.

4. The method of claim 1 wherein completing a backup of the dataset to the backup disk further comprises:
- verifying availability of the backup disk associated with the disk backup server.

5. The method of claim 1 completing a backup of the dataset from the backup disk to the backup tape further comprises;
- generating a combined backup identifier that references both the backup disk and the backup tape; and
- storing the combined backup identifier in a storage area available for subsequent access when performing a restoration of the dataset from the backup tape used with the combined backup request.

6. A method of fulfilling a request to restore a target dataset from a backup tape to a backup disk, comprising:
- receiving a request to restore a backup of the target dataset from a backup tape in accordance with a resolved schedule derived from resolving potential conflicts from a tape restore schedule and a disk restore schedule;
- verifying a backup tape holds the target dataset by matching a combined backup identifier from the request to restore against an associated combined backup identifier held in storage associated with the backup tape;
- restoring from the backup tape the target dataset in accordance with the combined backup identifier as verified; and
- delivering the target dataset as requested from tape to a predetermined disk storage location.

7. The method of claim 6 wherein the combined backup identifier references both the backup disk and the backup tape used in performing the backup of the dataset.

8. The method of claim 6 wherein completing a restoration of the dataset from the backup tape to the backup disk further comprises:
- verifying availability of a tape backup device associated with the tape backup server when the dataset is successfully backed up to the backup disk.

9. The method of claim 1 wherein completing a restoration of the dataset from the backup tape further comprises:
- verifying availability of the backup tape associated with the tape backup server.

10. The method of claim 6 wherein restoring from the backup tape further comprises:
- extracting from the backup tape a raw target dataset and associated disk metadata outlining the format of the raw target data; and
- assembling the raw target dataset into the target dataset according to the format prescribed by the disk metadata.

11. A method of fulfilling a request to perform a backup to a backup disk and then a backup tape, comprising:
- receiving a combined backup request to backup a dataset to a backup disk according to a disk backup schedule and then to backup the dataset from the backup disk to a backup tape according to a tape backup schedule;
- completing a backup of the dataset to the backup disk in accordance with a resolved schedule derived from resolving potential conflicts from the tape backup schedule and the disk backup schedule;
- completing a backup of the dataset from the backup disk to the backup tape associated with a tape backup server and in accordance with the resolved schedule;
- generating a combined backup identifier that references both the backup disk and the backup tape;
- storing the combined backup identifier in a storage area available for subsequent access when performing a restoration of the dataset from the backup tape used in association with the combined backup request; and
- indicating the combined backup request of the dataset to the backup disk and then to the backup tape has been successfully completed in reference to the combined backup identifier.

12. The method of claim 11 wherein deriving the resolved schedule further comprises:
- estimating a disk backup interval and a tape backup interval according to the combined backup request and consistent with the disk backup schedule for the backup disk and the tape backup schedule for the backup tape;
- comparing the disk backup interval with the tape backup interval to identify if a safety margin exists between the disk backup interval and tape backup interval; and
- adjusting the disk backup interval and the tape backup interval to increase the safety margin large enough to ensure that the disk backup to be performed during the disk backup interval is completed prior to the tape backup to be performed during the tape backup interval.

13. The method of claim 11 wherein completing a backup of the dataset from the backup disk to the backup tape further comprises:
- verifying availability of a tape backup device associated with the tape backup server when the dataset is successfully backed up to the backup disk.

14. The method of claim 11 wherein completing a backup of the dataset to the backup disk further comprises:
- verifying availability of the backup disk associated with the disk backup server.

15. The method of claim 11 completing a backup of the dataset from the backup disk to the backup tape further comprises;
- generating a combined backup identifier that references both the backup disk and the backup tape; and
- storing the combined backup identifier in a storage area available for subsequent access when performing a restoration of the dataset from the backup tape used with the combined backup request.

16. A storage system that fulfills a request to perform a disk-to-disk-to-tape backup, comprising:
- a processor configured to execute instructions;
- memory configured to hold instructions when executed on the processor that receive a combined backup request to backup a dataset to a backup disk according to a disk backup schedule and then to backup the dataset from the backup disk to a backup tape according to a tape backup schedule, complete a backup of the dataset to the backup disk in accordance with a resolved schedule derived from resolving potential conflicts from the tape backup schedule and the disk backup schedule, complete a backup of the dataset from the backup disk to the backup tape associated with a tape backup server and in accordance with the resolved schedule, and indicate the combined backup request of the dataset to the backup disk and then to the backup tape has been successfully completed.

17. The system of claim 16 further comprising instructions when executed,
   estimate a disk backup interval and a tape backup interval according to the combined backup request and consistent with the disk backup schedule for the backup disk and the tape backup schedule for the backup tape,
   compare the disk backup interval with the tape backup interval to identify if a safety margin exists between the disk backup interval and tape backup interval and
   adjust the disk backup interval and the tape backup interval to increase the safety margin large enough to ensure that the disk backup to be performed during the disk backup interval is completed prior to the tape backup to be performed during the tape backup interval.

18. The system of claim 16 wherein instructions that complete a backup of the dataset from the backup disk to the backup tape further comprise instructions that,
   verify availability of a tape backup device associated with the tape backup server when the dataset is successfully backed up to the backup disk.

19. The system of claim 16 wherein instructions that complete a backup of the dataset to the backup disk further comprise instructions that,
   verify availability of the backup disk associated with the disk backup server.

20. The system of claim 16 wherein instructions that complete a backup of the dataset from the backup disk to the backup tape further comprises instructions that,
   generate a combined backup identifier that references both the backup disk and the backup tape and
   store the combined backup identifier in a storage area available for subsequent access when performing a restoration of the dataset from the backup tape used with the combined backup request.

* * * * *